US012585095B2

(12) United States Patent

Otsu

(10) Patent No.: US 12,585,095 B2

(45) Date of Patent: Mar. 24, 2026

(54) PROJECTION OPTICAL SYSTEM

(71) Applicant: NISSEI TECHNOLOGY CORPORATION, Hyogo (JP)

(72) Inventor: Takuya Otsu, Hyogo (JP)

(73) Assignee: NISSEI TECHNOLOGY CORPORATION, Hyogo (JP)

( * ) Notice: Subject to any disclaimer, the term of this patent is extended or adjusted under 35 U.S.C. 154(b) by 188 days.

(21) Appl. No.: 18/661,771

(22) Filed: May 13, 2024

(65) Prior Publication Data

US 2024/0295722 A1     Sep. 5, 2024

Related U.S. Application Data

(63) Continuation of application No. PCT/JP2021/042672, filed on Nov. 19, 2021.

(51) Int. Cl.
*G02B 13/16* (2006.01)
*G02B 9/12* (2006.01)
*G02B 13/18* (2006.01)

(52) U.S. Cl.
CPC .............. *G02B 13/16* (2013.01); *G02B 9/12* (2013.01); *G02B 13/18* (2013.01)

(58) Field of Classification Search
CPC ........... G02B 13/16; G02B 13/18; G02B 9/12
USPC ........................................................ 359/738
See application file for complete search history.

(56) References Cited

U.S. PATENT DOCUMENTS

2019/0219789 A1 * 7/2019 Mogi ................. G02B 27/0025
2020/0041771 A1    2/2020 Peng et al.

FOREIGN PATENT DOCUMENTS

| JP | H7-270682 A | 10/1995 |
| JP | 2011-81072 A | 4/2011 |
| JP | 2018-084704 A | 5/2018 |
| JP | 2020-021054 A | 2/2020 |
| JP | 2020-126108 A | 8/2020 |

OTHER PUBLICATIONS

International Search Report issued in PCT/JP2021/042672 mailed on Feb. 1, 2022 with English Translation (5 pages).
Written Opinion of International Searching Authority issued in PCT/JP2021/042672 mailed on Feb. 1, 2022 with English Translation (5 pages).

* cited by examiner

*Primary Examiner* — Bumsuk Won
*Assistant Examiner* — Mitchell T Oestreich
(74) *Attorney, Agent, or Firm* — Nakanishi IP Associates, LLC

(57) ABSTRACT

A projection optical system includes, in sequence from a projection surface: an aperture stop; a first lens with a positive refractive power; a second lens with a positive refractive power; and a third lens with a positive refractive power. The third lens have a convex surface closer to the projection surface. The projection system satisfies: $1.0 < f/EPD < 1.35$, $1.0 < (r2+r1)/(r2−r1) < 1.45$, and $0.2 < d2/f < 0.45$, where f is a focal length of the overall projection optical system, EPD is an entrance pupil diameter, r1 is a radius of curvature of a surface of the first lens closer to the projection surface, r2 is a radius of curvature of a surface of the first lens closer to the image display element, and d2 is an air spacing between the first lens and the second lens on an optical axis.

2 Claims, 12 Drawing Sheets

FIG. 2A
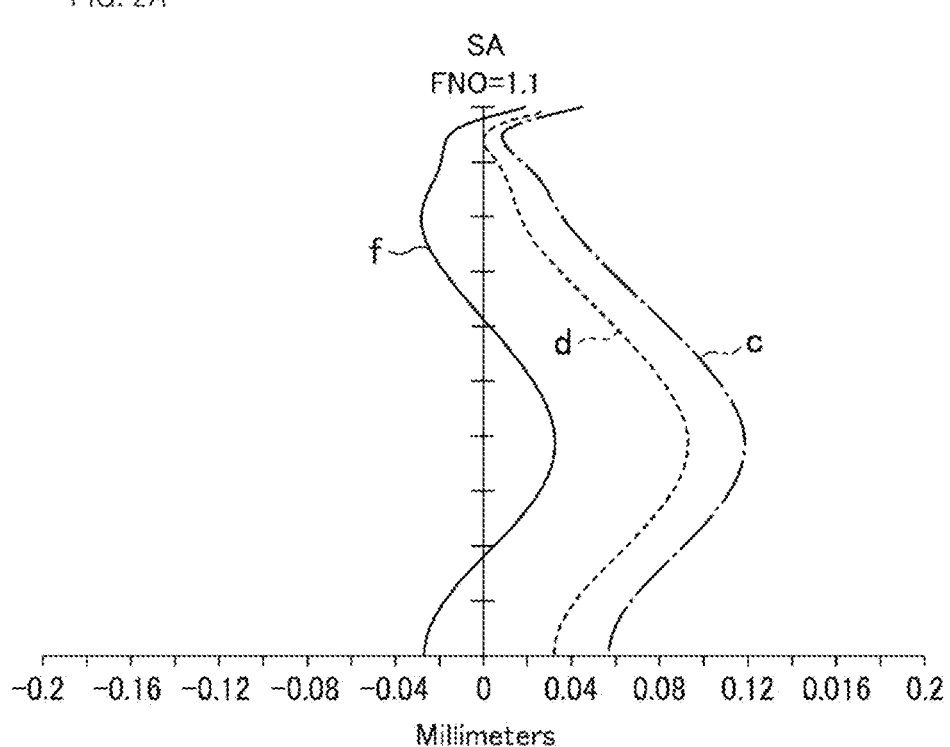
FIG. 2B
FIG. 2C
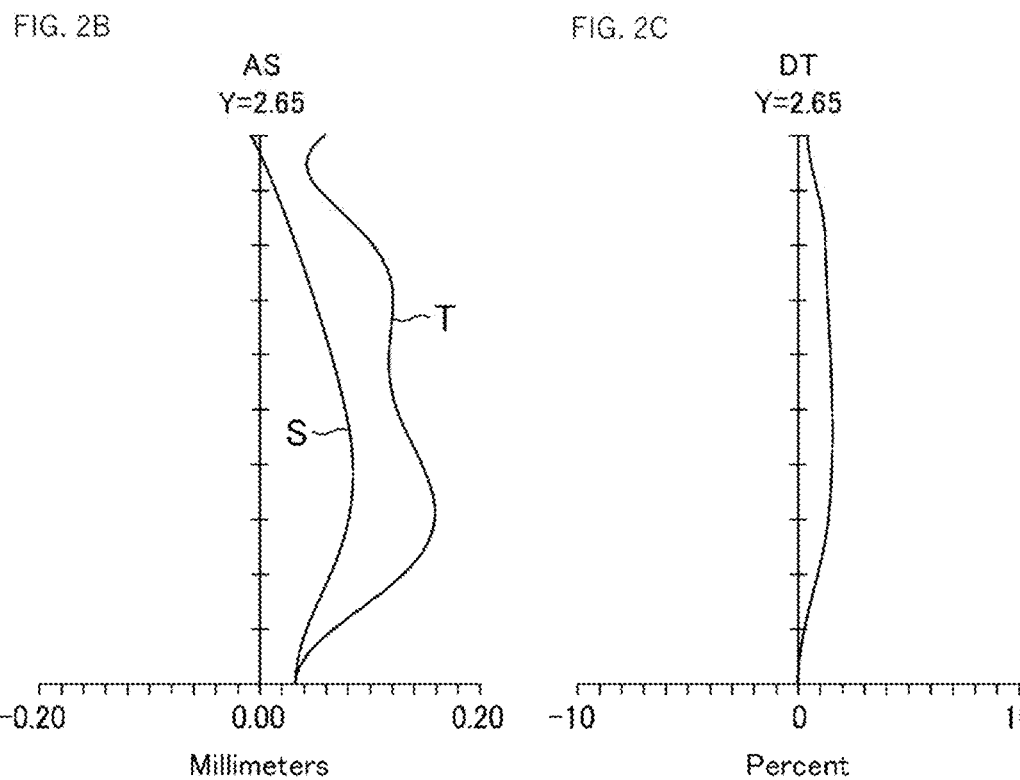

FIG. 4A
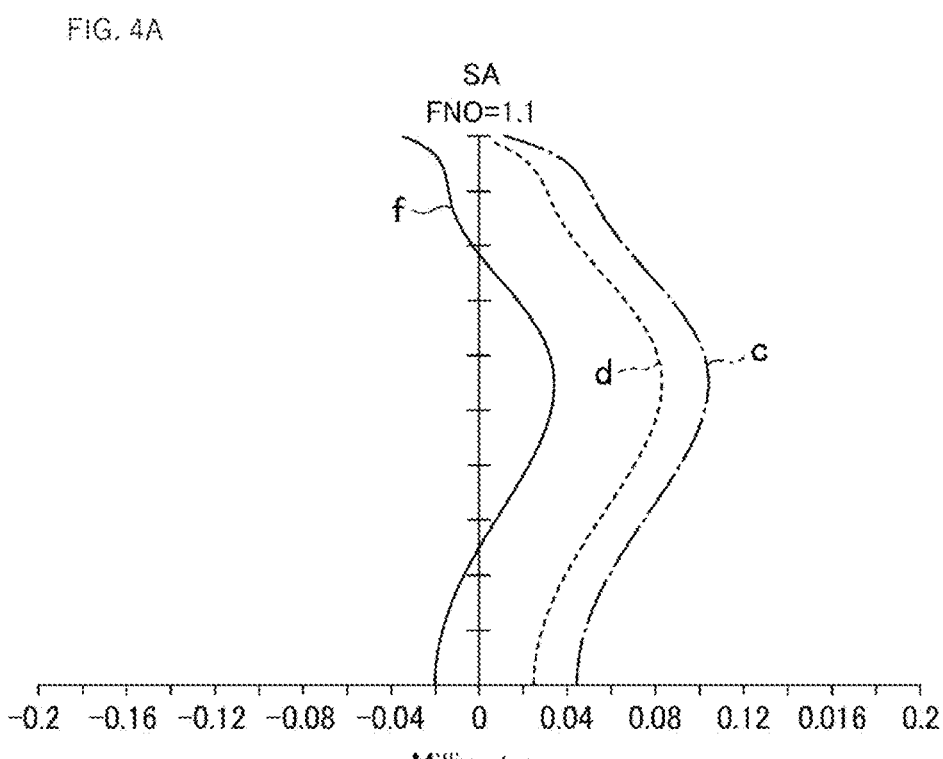
SA
FNO=1.1
Millimeters
FIG. 4B
FIG. 4C
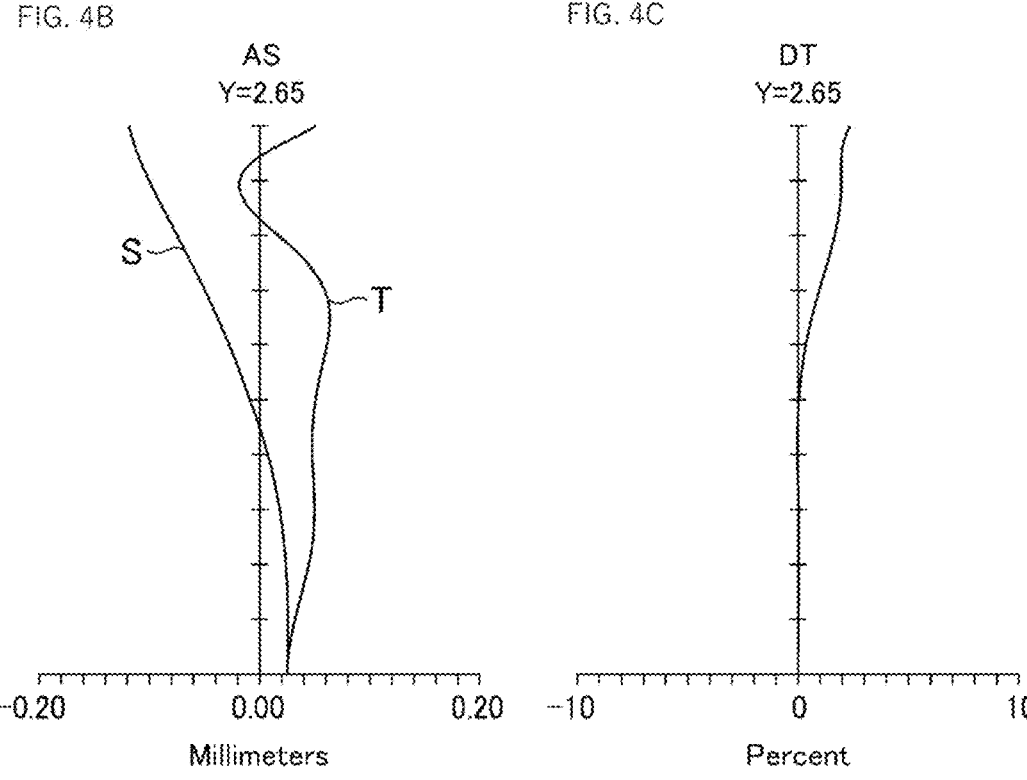
AS
Y=2.65
Millimeters
DT
Y=2.65
Percent

SA
FNO=1.1 f d c

-0.2  -0.16  -0.12  -0.08  -0.04  0  0.04  0.08  0.12  0.016  0.2

Millimeters

Millimeters                      Percent

FIG. 10B                                    FIG. 10C

PROJECTION OPTICAL SYSTEM

CROSS-REFERENCE TO RELATED APPLICATIONS

This application is a continuation application of International Patent Application No. PCT/JP2021/042672 filed on Nov. 19, 2021, the entire content of which is incorporated by reference.

BACKGROUND OF INVENTION

Field of the Invention

The present invention relates to a projection optical system that projects an image from an image display element or a light source image from, for example, a three-dimensional (3D) measuring device in a magnified manner.

Background Art

Portable compact mobile projectors that have been in practical use include light sources that are high-luminance light-emitting diodes (LEDs) as image display elements such as liquid crystal display (LCD) elements. A known compact projection optical system is an optical system with reduced total length mounted on such a mobile projector to project an image in a magnified manner (refer to, for example, Patent Literature 1 or Patent Literature 2).

CITATION LIST

Patent Literature

Patent Literature 1: Japanese Unexamined Patent Application Publication No. 2011-81072
Patent Literature 2: Japanese Unexamined Patent Application Publication No. 7-270682
Nowadays, high-luminance image display elements using, for example, micro-LED elements as pixels have been developed. Such micro-LED elements each include self-luminous LED pixels and do not use high-luminance backlight with high power consumption, and thus can be image display elements with higher image quality and higher luminance with lower power consumption. Such micro-LED elements being practical are expected to be used as image display elements in, for example, compact optical devices including augmented reality (AR) wearable terminals, head-up displays (HUDs), and portable single focus projectors.

Additionally, 3D measuring devices have received attention as a method for acquiring information about the distance to a target object or about the 3D shape of the target object. Such 3D measuring devices are designed to project a microscopic pattern of light (structured light) onto a target object to be measured, cause an imager to capture an image of the target object projected with the pattern light, and perform predetermined calculations to acquire information about the distance to the target object or about the 3D shape of the target object based on each point in the captured image.

A projection optical system mounted on such an optical device is expected to be compact and has a shorter total length, achieve brighter lens performance with a small f-number, and achieve higher resolution. However, known projection optical systems that are compact and mountable onto compact optical devices are less likely to achieve such optical performance.

SUMMARY OF INVENTION

One or more aspects of the present invention are directed to a projection optical system that is compact, has a shorter total length, and achieves brighter lens performance as well as higher resolution.

A projection optical system according to one or more aspects of the present invention is a projection optical system for projecting an image from an image display element in a magnified manner onto a projection surface. The system includes, in sequence from the projection surface, an aperture stop, a first lens with a positive refractive power, a second lens with a positive refractive power, and a third lens with a positive refractive power. The third lens has a convex surface closer to the projection surface. The projection optical system satisfies the conditional expressions:

$$1.0 < f/EPD < 1.35 \tag{1}$$

$$1.0 < (r2 + r1)/(r2 - r1) < 1.45 \tag{2}$$

$$0.2 < d2/f < 0.45 \tag{3}$$

where f is a focal length of the overall projection optical system, EPD is an entrance pupil diameter, r1 is a radius of curvature of a projection surface side of the first lens surface, r2 is a radius of curvature of an image display element side of the first lens surface, and d2 is an air spacing between the first lens and the second lens on an optical axis.

A projection optical system according to one or more aspects of the present invention may satisfy the conditional expression:

$$0.001 < c2/f < 0.015 \tag{4}$$

where c2 is a curvature of the surface of the first lens closer to the image display element.

A projection optical system according to one or more aspects of the present invention may satisfy the conditional expression:

$$15 < |(r4 + r3)/(r4 - r3)| < 35 \tag{5}$$

where r3 is a radius of curvature of a projection surface side of the second lens surface, and r4 is a radius of curvature of an image display element side of the second lens surface.

The projection optical system according to the above aspects of the present invention is compact, has a shorter total length, and achieves brighter lens performance as well as higher resolution.

BRIEF DESCRIPTION OF THE DRAWINGS

FIG. 2A is a graph showing spherical aberration (SA) of the projection optical system according to the first embodiment in focus, FIG. 2B is a graph showing its astigmatism (AS), and FIG. 2C is a graph showing its distortion (DT).

FIG. 4A is a graph showing spherical aberration (SA) of the projection optical system according to the second embodiment in focus, FIG. 4B is a graph showing its astigmatism (AS), and FIG. 4C is a graph showing its distortion (DT).

FIG. 8B is a graph showing its astigmatism (AS), and FIG. 8C is a graph showing its distortion (DT).

FIG. 10B is a graph showing its astigmatism (AS), and FIG. 10C is a graph showing its distortion (DT).

DETAILED DESCRIPTION

One or more embodiments of the present invention will now be described with reference to the drawings.

Figure 1:
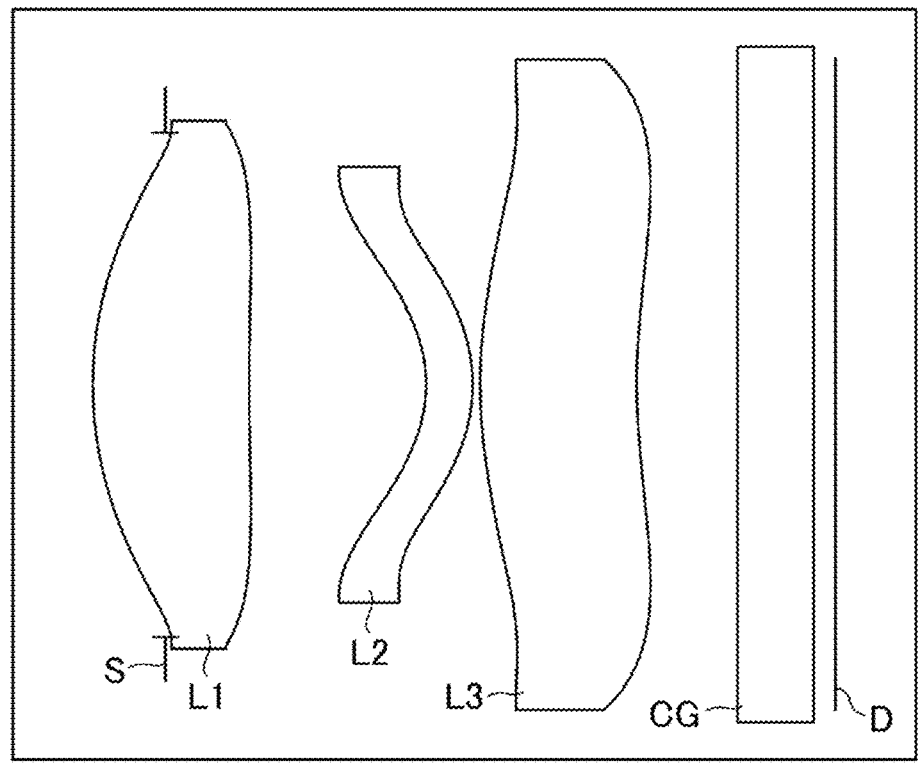
FIG. 1 is a cross-sectional view of a projection optical system according to a first embodiment of the present invention taken along the optical axis, showing its optical structure.

FIG. 1 is a cross-sectional view of a projection optical system according to one embodiment of the present invention taken along the optical axis, showing its optical structure. The optical structure shown in FIG. 1 corresponds to an optical structure according to a first embodiment.

The projection optical system according to one or more embodiments of the present invention includes, in sequence from a projection surface as a magnified projection surface, an aperture stop, a first lens with a positive refractive power, a second lens with a positive refractive power, and a third lens with a positive refractive power having its convex surface closer to the projection surface. In the embodiments below, the cross-sectional views each show the optical structure including a glass cover CG and an image display element with a display surface D located at the reduction end of the projection optical system.

In the projection optical system according to one or more embodiments of the present invention, the first lens L1, the second lens L2, and the third lens L3 are aspherical plastic lenses.

The projection optical system according to one or more embodiments of the present invention includes the image display element forming an image, such as a liquid crystal display (LCD) element, a digital mirror device (DMD), or a micro-light-emitting diode (LED) display (not shown) on the display surface D.

The projection optical system according to one or more embodiments of the present invention satisfies the following conditional expressions:

$$1.0 < f/EPD < 1.35 \tag{1}$$

$$1.0 < (r2 + r1)/(r2 - r1) < 1.45 \tag{2}$$

$$0.2 < d2/f < 0.45 \tag{3}$$

where f is the focal length of the overall projection optical system, EPD is an entrance pupil diameter, r1 is a radius of curvature of a surface of the first lens closer to the projection surface, r2 is a radius of curvature of a surface of the first lens closer to the image display element, and d2 is an air spacing between the first lens and the second lens on the optical axis.

The conditional expressions (2) and (3) are defined to appropriately correct spherical aberration in a bright optical system having an f-number within a range of the conditional expression (1). Outside the ranges of the conditional expressions (2) and (3), the spherical aberration is likely to increase.

The conditional expression (3) is defined to reduce a total length of the projection optical system as well as to correct distortion and coma aberration. Below the lower limit value of the conditional expression (3), the distortion may increase and the coma aberration may not be fully corrected. Above the upper limit value of the conditional expression (3), the total length of the projection optical system may not be fully reduced.

The projection optical system according to the present embodiment satisfies the following conditional expression:

$$0.001 < c2/f < 0.015 \tag{4}$$

where c2 is a curvature of the surface of the first lens closer to the image display element.

The conditional expression (4) is defined to appropriately correct the spherical aberration in the bright optical system having the f-number within the range of the conditional expression (1). Outside the range of the conditional expression (4), the spherical aberration is likely to increase.

The projection optical system according to the present embodiment satisfies the following conditional expression:

$$15 < |(r4 + r3)/(r4 - r3)| < 35 \tag{5}$$

where r3 is a radius of curvature of a projection surface side of the second lens surface, and r4 is a radius of curvature of an image display element side of the second lens surface.

The conditional expression (5) is defined to correct a curvature of field as well as to correct the spherical aberration and the coma aberration in the optical system having the f-number within the range of the conditional expression (1). Outside the range of the conditional expression (5), the curvature of field may not be fully corrected, and further, the spherical aberration and the coma aberration may not be fully corrected.

EMBODIMENTS

Numerical working examples of the projection optical system according to the embodiments of the present invention will now be described in detail. In the embodiments, the symbols below are used.

f: focal length of the overall projection optical system
FNO: f-number
FOV (2ω): field of view
r: paraxial radius of curvature
d: thickness of a lens or an air spacing on the optical axis
nd: refractive index of a lens material for the d-line
vd: Abbe number of a lens material
c2: curvature of the surface of the first lens closer to the image display element
TTL: distance along the optical axis from the vertex of the first lens closer to the projection surface to the display surface of the image display element
BFL: back focus In the embodiments, the surface with a number followed by an asterisk is aspherical.

The shape of an aspherical surface is expressed by the following formula (I), where z is the optical axis direction, y is the direction perpendicular to the optical axis, K is the conic constant, and A4, A6, A8, A10, . . . are aspheric coefficients.

$$Z = (y^2/r)/\left[1 + \{1 - (1+K)(y/r)^2\}^{1/2}\right] + A4y^4 + A6y^6 + A8y^8 + A10y^{10} \quad (I)$$

For the aspheric coefficients, E represents a power of 10. For example, $2.3\times10^{-2}$ is written as 2.3E–002. These symbols used for the specification values are also used commonly for numerical data in the embodiments described below.

First Embodiment

A projection optical system according to the first embodiment will now be described.

FIG. 1 is a cross-sectional view of the projection optical system according to the first embodiment taken along the optical axis, showing its optical structure.

FIG. 2A is a graph showing spherical aberration (SA) of the projection optical system according to the first embodiment in focus, FIG. 2B is a graph showing its astigmatism (AS), and FIG. 2C is a graph showing its distortion (DT). The spherical aberration is a value at a wavelength of 486.1 nm (F-line), 587.6 nm (d-line), or 656.3 nm (c-line). The astigmatism and the distortion are values at the wavelength of 587.6 nm (d-line).

For the astigmatism, S represents the sagittal image surface, and T represents the tangential image surface. In the figures, FNO represents the f-number, and Y represents the image height. The symbols used in the figures showing SA, AS, and DT are also used commonly in the embodiments described later.

As shown in FIG. 1, the projection optical system includes, in sequence from the projection surface as a magnified projection surface, the aperture stop, the first lens with a positive refractive power, the second lens with a positive refractive power, and the third lens with a positive refractive power having its convex surface closer to the projection surface.

The projection optical system according to the first embodiment has the overall specifications below.

f: 4.57 mm
FNO: 1.1
f1: 5.53 mm
f2: 50.50 mm
f3: 17.16 mm
TTL: 6.85 mm
BFL: 1.70 mm

The projection optical system according to the first embodiment has surface data described below (in mm).

TABLE 1

| Lens Data in Frist Embodiment | | | | |
|---|---|---|---|---|
| | r | d | nd | vd |
| Aperture stop | Infinity | −0.667 | | |
| 2* | 2.830 | 1.440 | 1.545 | 56.0 |
| 3* | 35.036 | 1.636 | | |
| 4* | −1.050 | 0.431 | 1.636 | 24.0 |
| 5* | −1.181 | 0.065 | | |
| 6* | 3.547 | 1.445 | 1.636 | 24.0 |
| 7* | 4.383 | 0.931 | | |
| 8 | Infinity | 0.700 | 1.516 | 64.1 |
| 9 | Infinity | 0.200 | | |
| Image surface | | | | |

The projection optical system according to the first embodiment has aspherical surface data described below.
Second Surface
K=−6.703E−01
A4=−1.138E−03, A6=3.200E−03, A8=−1.843E−03, A10=4.352E−04, A12=−5.124E−05
Third Surface
K=−5.000E+00
A4=−5.240E−03, A6=8.058E−04, A8=−1.171E−03, A10=2.268E−04, A12=−1.784E−05
Fourth Surface
K=−8.860E−01
A4=6.397E−02, A6=−1.751E−02, A8=2.478E−02, A10=−8.481E−03, A12=9.646E−04
Fifth Surface
K=−2.581E+00
A4=−6.725E−02, A6=2.759E−02, A8=2.443E−03, A10=−3.322E−04, A12=−3.589E−04, A14=7.537E−05
Sixth Surface
K=−3.236E−01
A4=−2.686E−02, A6=6.547E−03, A8=−1.784E−03, A10=3.428E−04, A12=−4.961E−05, A14=3.278E−06
Seventh Surface
K=0−5.494E+00
A4=−3.663E−02, A6=1.173E−02, A8=−2.885E−03, A10=3.926E−04, A12=−3.093E−05, A14=1.087E−06

The conditional expressions (1) to (5) for the projection optical system according to the first embodiment yield the values below.

$$f/\text{EPD}=1.1 \tag{1}$$

$$(r2+r1)/(r2-r1)=1.18 \tag{2}$$

$$d2/f=0.36 \tag{3}$$

$$c2/f=0.006 \tag{4}$$

$$(r4+r3)/(r4-r3)=17.01 \tag{5}$$

Second Embodiment

A projection optical system according to a second embodiment will now be described.

Figure 3:
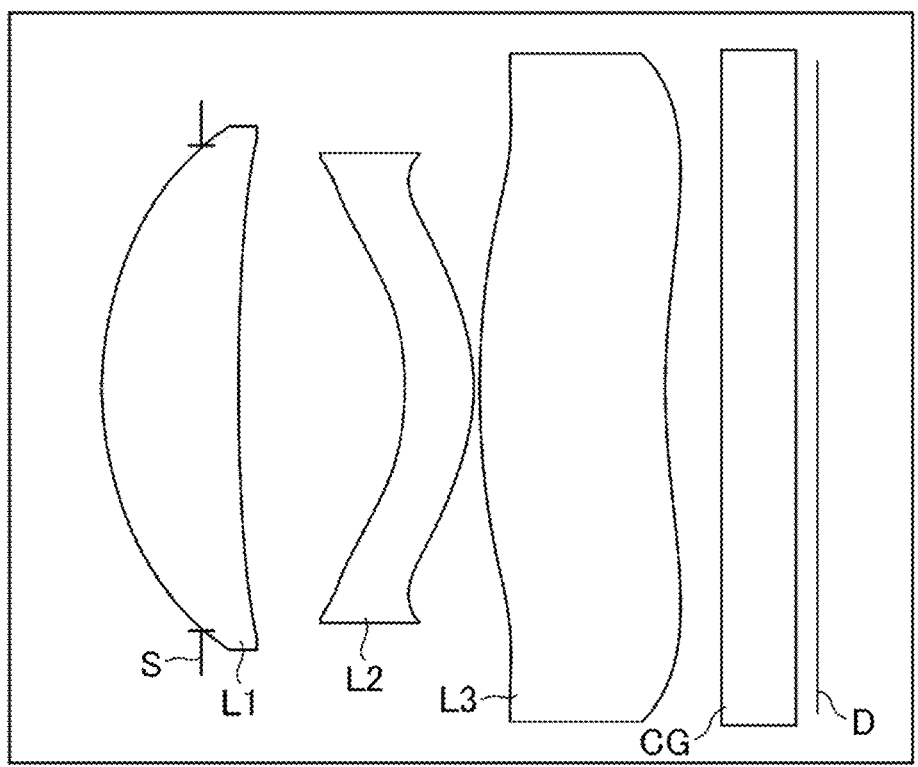
FIG. 3 is a cross-sectional view of a projection optical system according to a second embodiment of the present invention taken along the optical axis, showing its optical structure.

FIG. 3 is a cross-sectional view of a projection optical system according to the second embodiment taken along the optical axis, showing its optical structure.

FIG. 4A is a graph showing spherical aberration (SA) of the projection optical system according to the second embodiment in focus, FIG. 4B is a graph showing its astigmatism (AS), and FIG. 4C is a graph showing its distortion (DT).

As shown in FIG. 3, the projection optical system includes, in sequence from the projection surface as a magnified projection surface, an aperture stop, a first lens with a positive refractive power, a second lens with a positive refractive power, and a third lens with a positive refractive power having its convex surface closer to the projection surface.

The projection optical system according to the second embodiment has the overall specifications below.

f: 4.57 mm
FNO: 1.1
f1: 5.60 mm
f2: 14.76 mm
f3: 191.88 mm
TTL: 6.84 mm
BFL: 1.30 mm

The projection optical system according to the second embodiment has surface data described below (in mm).

TABLE 2

| Lens Data in Second Embodiment | | | |
| --- | --- | --- | --- |
| | r | d | nd | vd |
| Aperture stop | Infinity | −0.958 | | |
| 2* | 2.742 | 1.304 | 1.545 | 56.0 |
| 3* | 21.483 | 1.598 | | |
| 4* | −1.965 | 0.658 | 1.636 | 24.0 |
| 5* | −1.843 | 0.058 | | |
| 6* | 5.670 | 1.765 | 1.636 | 24.0 |
| 7* | 5.217 | 0.553 | | |
| 8 | Infinity | 0.700 | 1.516 | 64.1 |
| 9 | Infinity | 0.200 | | |
| Image surface | | | | |

The projection optical system according to the second embodiment has aspherical surface data described below.

Second Surface
K=2.342E−01
A4=−1.234E−03, A6=−6.121E−04, A8=7.252E−05, A10=−5.481E−06, A12=−1.399E−06
Third Surface
K=−4.997E+00
A4=3.520E−03, A6=−6.229E−04, A8=1.151E−04, A10=2.206E−06, A12=−1.860E−08
Fourth Surface
K=−1.117E−01
A4=−1.102E−02, A6=1.854E−02, A8=−1.102E−03, A10=−2.235E−05, A12=1.105E−05
Fifth Surface
K=−4.539E+00
A4=−6.495E−02, A6=2.393E−02, A8=−7.746E−04, A10=−7.474E−04, A12=1.484E−04, A14=−1.317E−06

Sixth Surface
K=1.011E+00
A4=−8.386E−03, A6=1.855E−03, A8=−2.023E−04, A10=−8.220E−05, A12=1.370E−05, A14=−5.206E−07
Seventh Surface
K=2.797E−01
A4=−3.215E−02, A6=9.150E−03, A8=−1.743E−03, A10=1.299E−04, A12=−1.892E−06, A14=−1.286E−07

The conditional expressions (1) to (5) for the projection optical system according to the second embodiment yield the values below.

$$f/EPD=1.1 \tag{1}$$

$$(r2+r1)/(r2−r1)=1.29 \tag{2}$$

$$d2/f=0.35 \tag{3}$$

$$c2/f=0.010 \tag{4}$$

$$(r4+r3)/(r4−r3)=−31.23 \tag{5}$$

Third Embodiment

A projection optical system according to a third embodiment will now be described.

Figure 5:
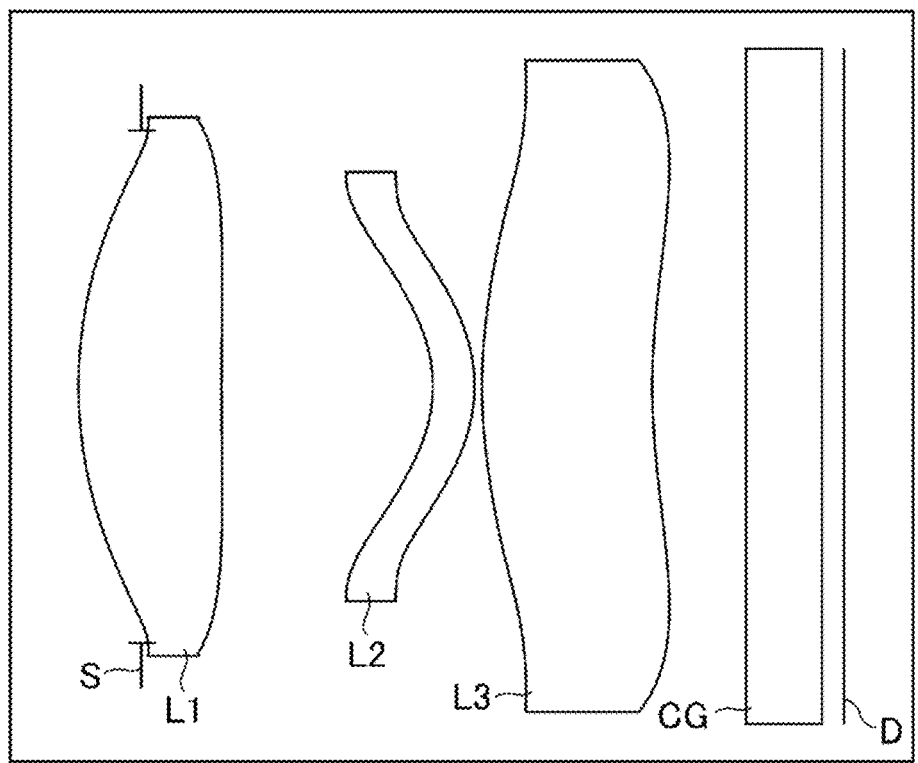
FIG. 5 is a cross-sectional view of a projection optical system according to a third embodiment of the present invention taken along the optical axis, showing its optical structure.

FIG. 5 is a cross-sectional view of the projection optical system according to the third embodiment taken along the optical axis, showing its optical structure.

Figure 6A:
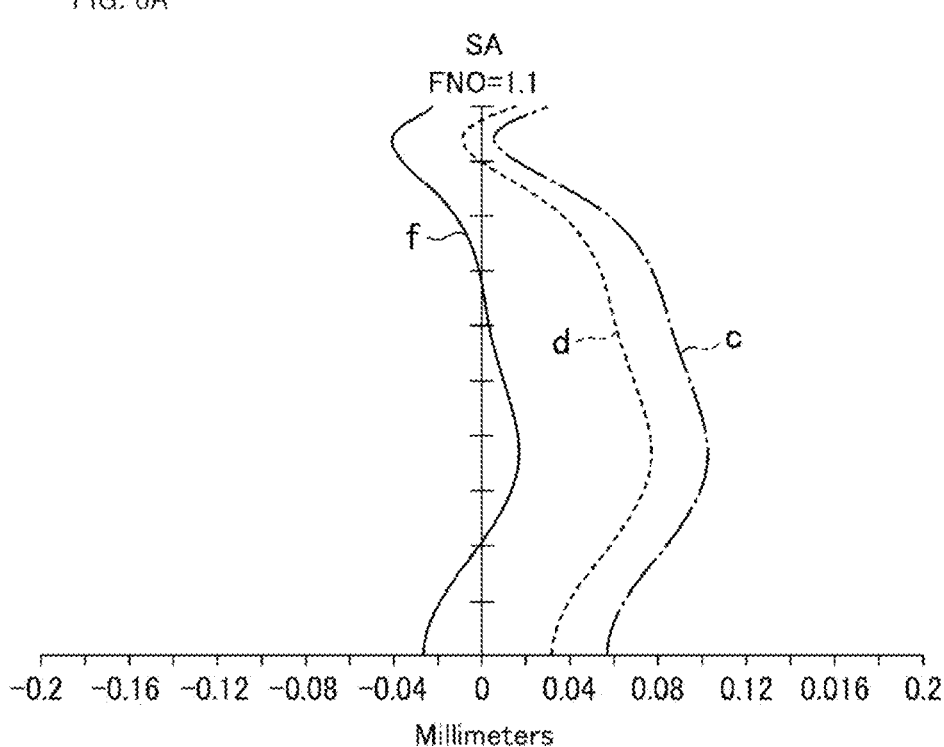
FIG. 6A is a graph showing spherical aberration (SA) of the projection optical system according to the third embodiment in focus.
Figure 6B:
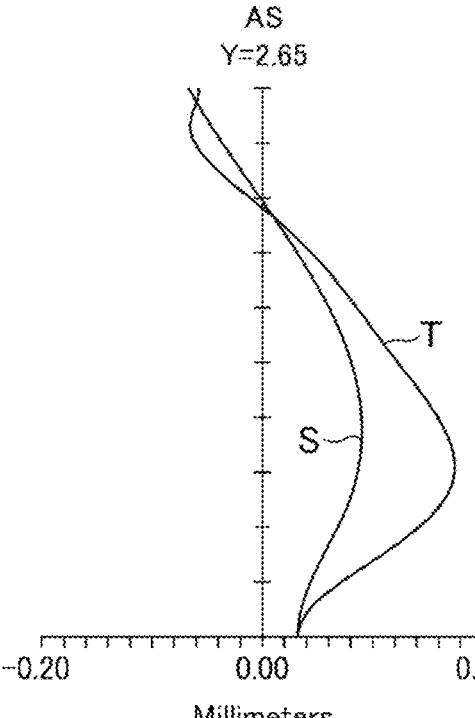
FIG. 6B is a graph showing its astigmatism (AS)
Figure 6C:
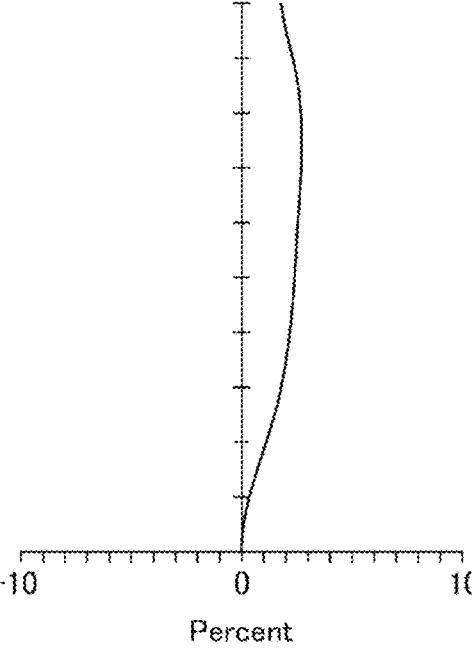
FIG. 6C is a graph showing its distortion (DT).

FIG. 6A is a graph showing spherical aberration (SA) of the projection optical system according to the third embodiment in focus, FIG. 6B is a graph showing its astigmatism (AS), and FIG. 6C is a graph showing its distortion (DT).

As shown in FIG. 5, the projection optical system includes, in sequence from the projection surface as a magnified projection surface, an aperture stop, a first lens with a positive refractive power, a second lens with a positive refractive power, and a third lens with a positive refractive power having its convex surface closer to the projection surface.

The projection optical system according to the third embodiment has the overall specifications below.

f: 4.60 mm
FNO: 1.1
f1: 5.82 mm
f2: 31.31 mm
f3: 17.82 mm
TTL: 7.00 mm
BFL: 1.60 mm

The projection optical system according to the third embodiment has surface data described below (in mm).

TABLE 3

| Lens Data in Third Embodiment | | | |
| --- | --- | --- | --- |
| | r | d | nd | vd |
| Aperture stop | Infinity | −0.577 | | |
| 2* | 3.124 | 1.312 | 1.545 | 56.0 |
| 3* | 124.096 | 1.930 | | |
| 4* | −1.061 | 0.381 | 1.636 | 24.0 |
| 5* | −1.150 | 0.065 | | |
| 6* | 3.820 | 1.554 | 1.636 | 24.0 |
| 7* | 4.805 | 0.858 | | |
| 8 | Infinity | 0.700 | 1.516 | 64.1 |
| 9 | Infinity | 0.200 | | |
| Image surface | | | | |

The projection optical system according to the third embodiment has aspherical surface data described below.

Second Surface

K=−7.324E−01

A4=−1.259E−03, A6=2.919E−03, A8=−1.905E−03, A10=4.359E−04, A12=−4.510E−05

Third Surface

K=−4.761E+00

A4=−4.363E−03, A6=1.130E−03, A8=−1.129E−03, A10=2.267E−04, A12=−1.936E−05

Fourth Surface

K=−8.857E−01

A4=6.407E−02, A6=−1.779E−02, A8=2.476E−02, A10=−8.444E−03, A12=9.533E−04

Fifth Surface

K=−2.519E+00

A4=−6.779E−02, A6=2.771E−02, A8=2.484E−03, A10=−3.883E−04, A12=−4.040E−04, A14=7.779E−05

Sixth Surface

K=8.146E−01

A4=−2.280E−02, A6=6.046E−03, A8=−1.953E−03, A10=3.601E−04, A12=−4.354E−05, A14=2.249E−06

Seventh Surface

K=3.757E−03

A4=−3.567E−02, A6=1.119E−02, A8=−2.848E−03, A10=3.973E−04, A12=−3.128E−05, A14=1.061E−06

The conditional expressions (1) to (5) for the projection optical system according to the third embodiment yield the values below.

$$f/\text{EPD}=1.1 \tag{1}$$

$$(r2+r1)/(r2-r1)=1.05 \tag{2}$$

$$d2/f=0.42 \tag{3}$$

$$c2/f=0.002 \tag{4}$$

$$(r4+r3)/(r4-r3)=24.81 \tag{5}$$

Fourth Embodiment

A projection optical system according to a fourth embodiment will now be described.

Figure 7:
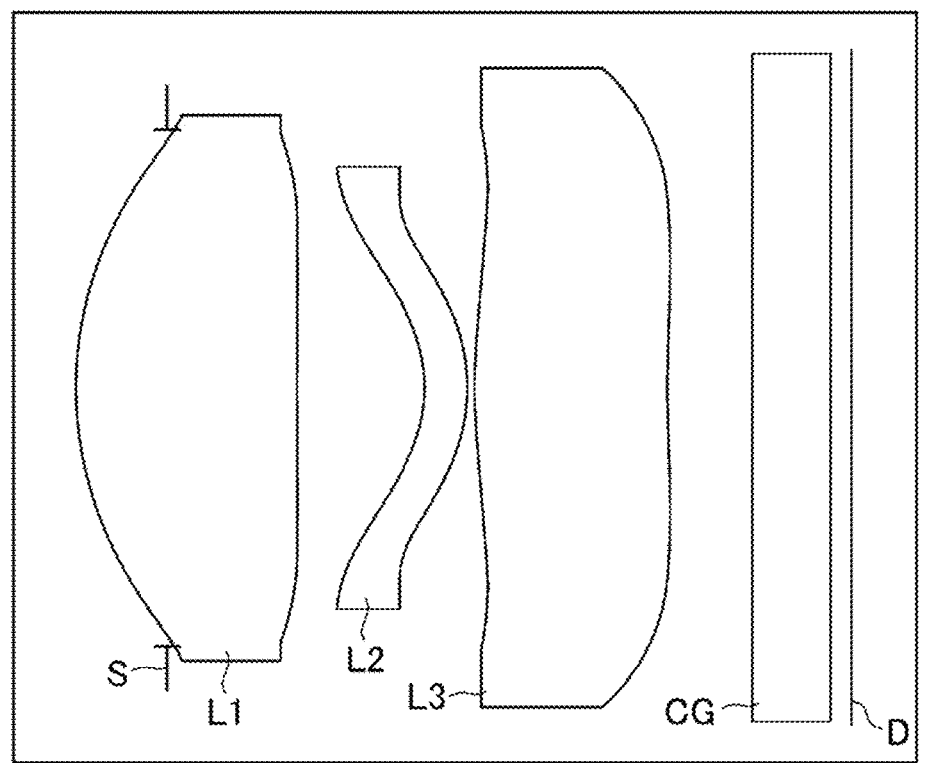
FIG. 7 is a cross-sectional view of a projection optical system according to a fourth embodiment of the present invention taken along the optical axis, showing its optical structure.

FIG. 7 is a cross-sectional view of the projection optical system according to the fourth embodiment taken along the optical axis, showing its optical structure.

Figure 8A:
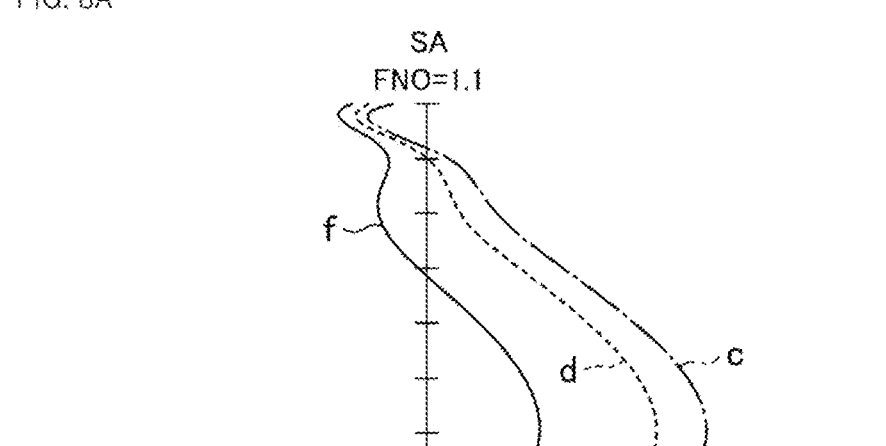
FIG. 8A is a graph showing spherical aberration (SA) of the projection optical system according to the fourth embodiment in focus.
Figure 8A:
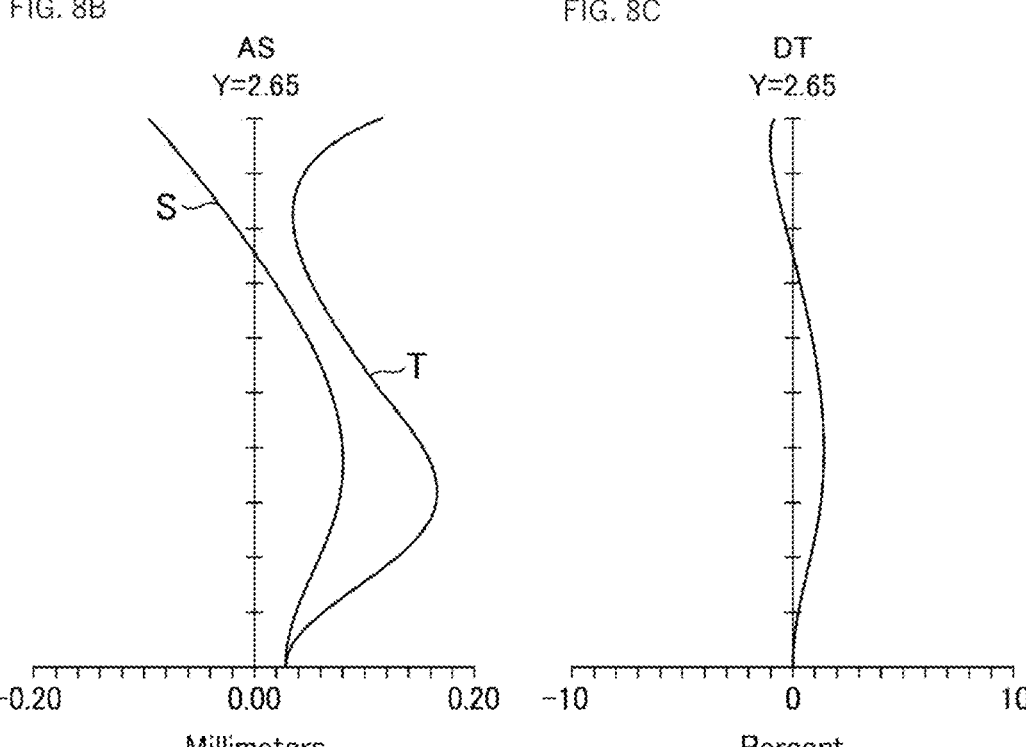

FIG. 8A is a graph showing spherical aberration (SA) of the projection optical system according to the fourth embodiment in focus, FIG. 8B is a graph showing its astigmatism (AS), and FIG. 8C is a graph showing its distortion (DT).

As shown in FIG. 7, the projection optical system includes, in sequence from the projection surface as a magnified projection surface, an aperture stop, a first lens with a positive refractive power, a second lens with a positive refractive power, and a third lens with a positive refractive power having its convex surface closer to the projection surface.

The projection optical system according to the fourth embodiment has the overall specifications below.

f: 4.60 mm

FNO: 1.1 f1: 5.22 mm f2: 36.48 mm f3: 24.21 mm

TTL: 7.00 mm

BFL: 1.64 mm

The projection optical system according to the fourth embodiment has surface data described below (in mm).

TABLE 4

| Lens Data in Fourth Embodiment | | | | |
|---|---|---|---|---|
| | r | d | nd | vd |
| Aperture stop | Infinity | −0.821 | | |
| 2* | 2.681 | 1.986 | 1.545 | 56.0 |
| 3* | 31.180 | 1.156 | | |
| 4* | −1.082 | 0.392 | 1.636 | 24.0 |
| 5* | −1.182 | 0.065 | | |
| 6* | 5.868 | 1.733 | 1.636 | 24.0 |
| 7* | 8.309 | 0.771 | | |
| 8 | Infinity | 0.700 | 1.516 | 64.1 |
| 9 | Infinity | 0.200 | | |
| Image surface | | | | |

The projection optical system according to the fourth embodiment has aspherical surface data described below.

Second Surface

K=−5.946E−01

A4=−1.373E−03, A6=3.537E−03, A8=−1.782E−03, A10=4.467E−04, A12=−4.763E−05

Third Surface

K=−5.000E+00

A4=−5.138E−03, A6=5.113E−04, A8=−1.237E−03, A10=2.329E−04, A12=−1.360E−05

Fourth Surface

K=−8.897E−01

A4=6.499E−02, A6=−1.784E−02, A8=2.458E−02, A10=−8.543E−03, A12=9.564E−04

Fifth Surface

K=−2.731E+00

A4=−6.416E−02, A6=2.879E−02, A8=2.784E−03, A10=−2.896E−04, A12=−3.750E−04, A14=6.652E−05

Sixth Surface

K=6.575E−01

A4=−2.162E−02, A6=5.317E−03, A8=−1.955E−03, A10=4.556E−04, A12=−1.065E−04, A14=1.205E−05

Seventh Surface

K=−5.005E+00

A4=−3.582E−02, A6=8.991E−03, A8=−2.436E−03, A10=4.038E−04, A12=−4.095E−05, A14=1.853E−06

The conditional expressions (1) to (5) for the projection optical system according to the fourth embodiment yield the values below.

$$f/\text{EPD}=1.1 \tag{1}$$

$$(r2+r1)/(r2-r1)=1.19 \tag{2}$$

$$d2/f=0.25 \tag{3}$$

$$c2/f=0.007 \tag{4}$$

$$(r4+r3)/(r4-r3)=22.79 \tag{5}$$

Fifth Embodiment

A projection optical system according to a fifth embodiment will now be described.

Figure 9:
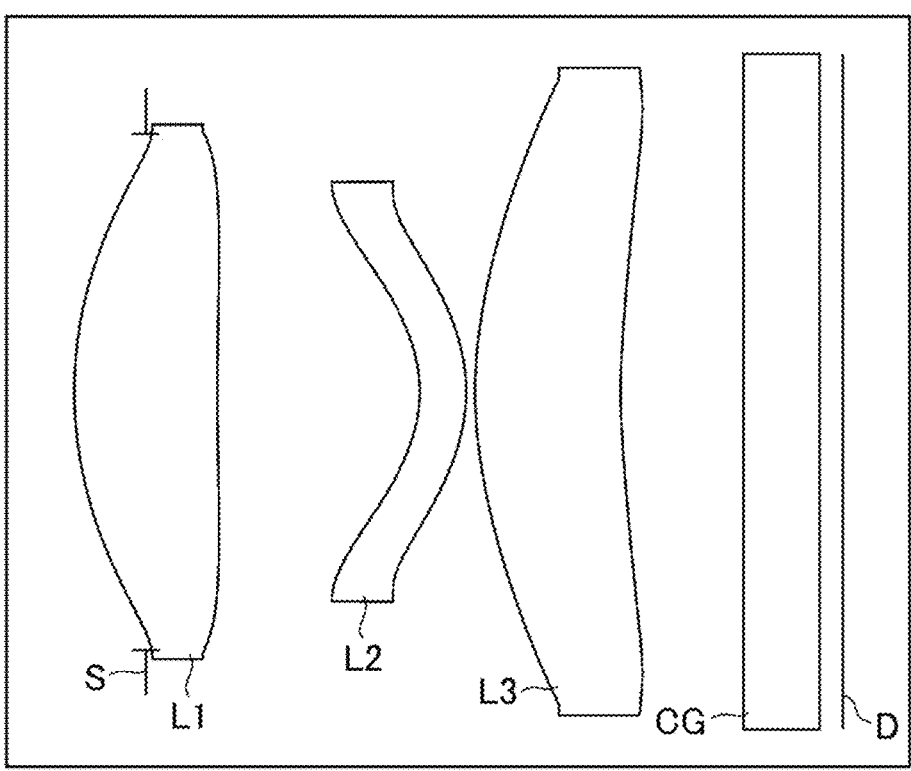
FIG. 9 is a cross-sectional view of a projection optical system according to a fifth embodiment of the present invention taken along the optical axis, showing its optical structure.

FIG. 9 is a cross-sectional view of the projection optical system according to the fifth embodiment taken along the optical axis, showing its optical structure.

Figure 10A:
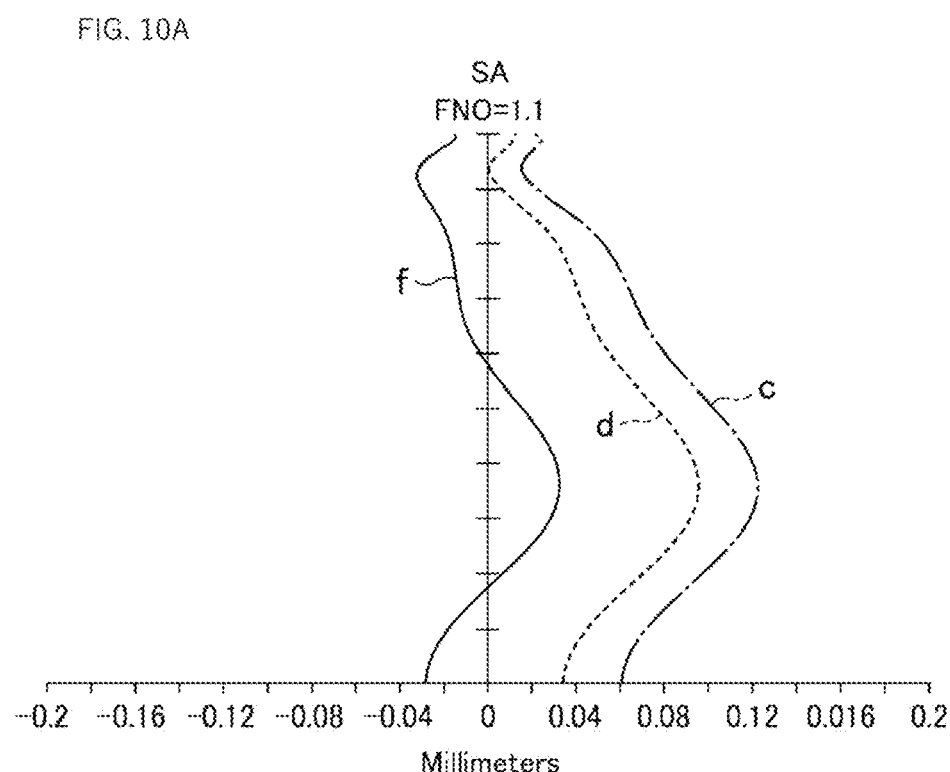
FIG. 10A is a graph showing spherical aberration (SA) of the projection optical system according to the fifth embodiment in focus.
Figure 10A:
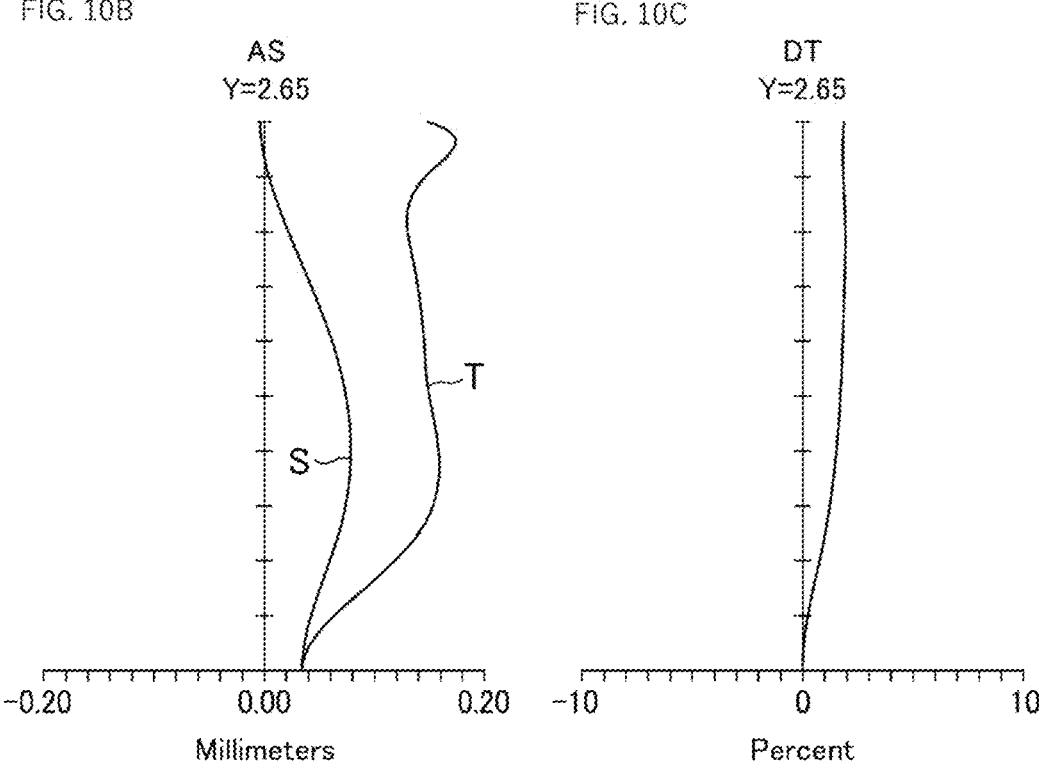

FIG. 10A is a graph showing spherical aberration (SA) of the projection optical system according to the fifth embodiment in focus, FIG. 10B is a graph showing its astigmatism (AS), and FIG. 10C is a graph showing its distortion (DT).

As shown in FIG. 9, the projection optical system includes, in sequence from the projection surface as a magnified projection surface, an aperture stop, a first lens with a positive refractive power, a second lens with a positive refractive power, and a third lens with a positive refractive power having its convex surface closer to the projection surface.

The projection optical system according to the fifth embodiment has the overall specifications below.

f: 4.60 mm
FNO: 1.1
f1: 5.93 mm
f2: 223.00 mm
f3: 10.11 mm
TTL: 7.00 mm
BFL: 1.81 mm

The projection optical system according to the fifth embodiment has surface data described below (in mm).

TABLE 5

| Lens Data in Fifth Embodiment | | | | |
| --- | --- | --- | --- | --- |
| | r | d | nd | vd |
| Aperture stop | Infinity | −0.643 | | |
| 2* | 2.975 | 1.302 | 1.545 | 56.0 |
| 3* | 29.868 | 1.858 | | |
| 4* | −1.039 | 0.433 | 1.636 | 24.0 |
| 5* | −1.200 | 0.065 | | |
| 6* | 3.229 | 1.330 | 1.636 | 24.0 |
| 7* | 5.358 | 1.110 | | |
| 8 | Infinity | 0.700 | 1.516 | 64.1 |
| 9 | Infinity | 0.200 | | |
| Image surface | | | | |

The projection optical system according to the fifth embodiment has aspherical surface data described below.
Second Surface
K=−8.097E−01
A4=−3.447E−03, A6=4.555E−03, A8=−2.147E−03, A10=4.571E−04, A12=−4.593E−05
Third Surface
K=−5.010E+00
A4=−6.084E−03, A6=1.964E−03, A8=−1.068E−03, A10=1.591E−04, A12=−1.183E−05
Fourth Surface
K=−8.369E−01
A4=9.149E−02, A6=−2.670E−02, A8=2.476E−02, A10=−8.081E−03, A12=9.414E−04
Fifth Surface
K=−2.452E+00
A4=−5.077E−02, A6=2.268E−02, A8=2.078E−03, A10=−8.299E−04, A12=−1.324E−04, A14=4.267E−05
Sixth Surface
K=−9.256E−01
A4=−2.152E−02, A6=8.693E−03, A8=−2.465E−03, A10=3.974E−04, A12=−3.249E−05, A14=1.010E−06
Seventh Surface
K=4.819E−01
A4=−3.239E−02, A6=1.178E−02, A8=−3.011E−03, A10=4.276E−04, A12=−3.137E−05, A14=8.910E−07

The conditional expressions (1) to (5) for the projection optical system according to the fifth embodiment yield the values below.

$$f/\text{EPD}=1.1 \tag{1}$$

$$(r2+r1)/(r2-r1)=1.22 \tag{2}$$

$$d2/f=0.40 \tag{3}$$

$$c2/f=0.007 \tag{4}$$

$$(r4+r3)/(r4-r3)=13.88 \tag{5}$$

Sixth Embodiment

A projection optical system according to a sixth embodiment will now be described.

Figure 11:
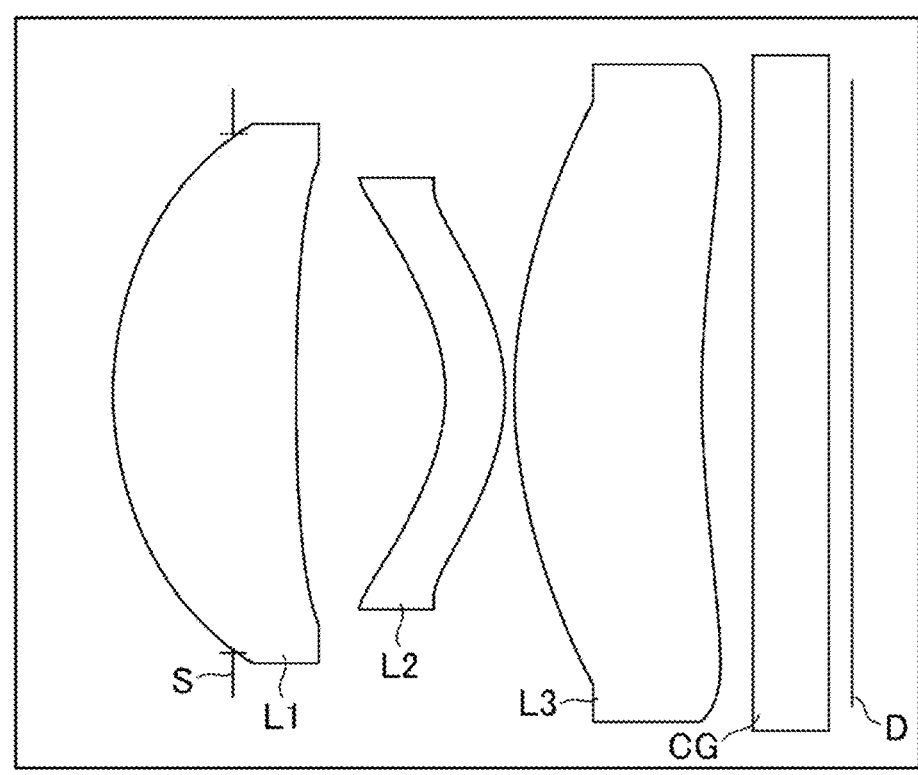
FIG. 11 is a cross-sectional view of a projection optical system according to a sixth embodiment of the present invention taken along the optical axis, showing its optical structure.

FIG. 11 is a cross-sectional view of the projection optical system according to the sixth embodiment taken along the optical axis, showing its optical structure.

Figures 12A, 12B, 12C:
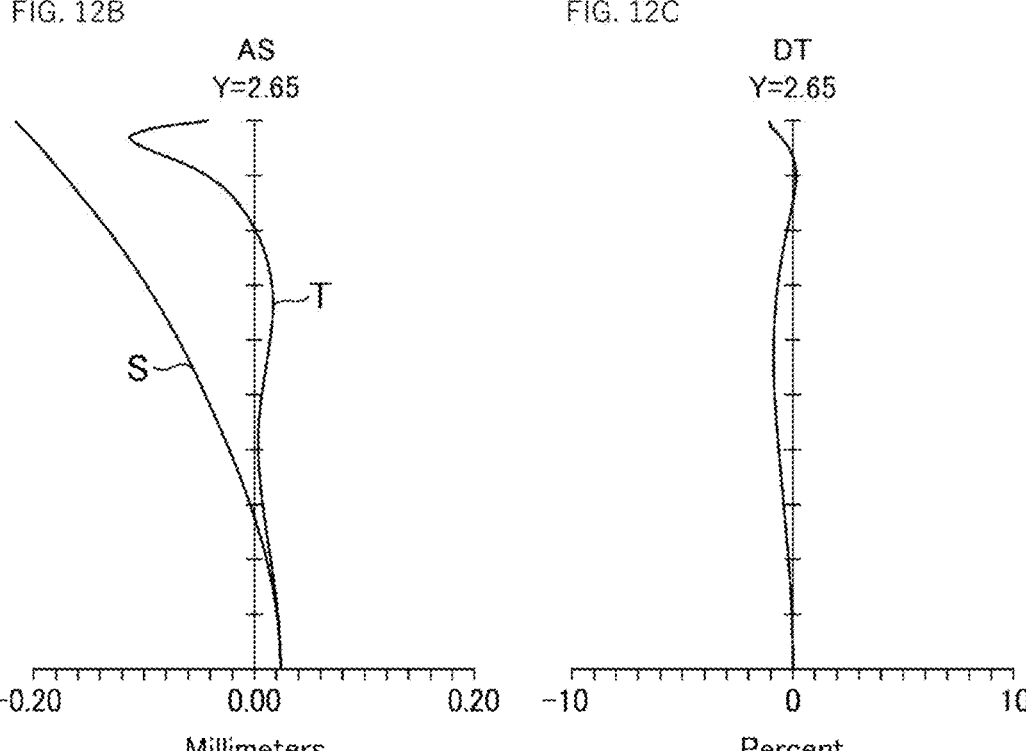
FIG. 12A is a graph showing spherical aberration (SA) of the projection optical system according to the sixth embodiment in focus.
FIG. 12B is a graph showing its astigmatism (AS)
FIG. 12C is a graph showing its distortion (DT).

FIG. 12A is a graph showing spherical aberration (SA) of the projection optical system according to the sixth embodiment in focus, FIG. 12B is a graph showing its astigmatism (AS), and FIG. 12C is a graph showing its distortion (DT).

As shown in FIG. 11, the projection optical system includes, in sequence from the projection surface as a magnified projection surface, an aperture stop, a first lens with a positive refractive power, a second lens with a positive refractive power, and a third lens with a positive refractive power having its convex surface closer to the projection surface.

The projection optical system according to the sixth embodiment has the overall specifications below.

f: 4.60 mm
FNO: 1.05
f1: 5.78 mm
f2: 40.28 mm
f3: 17.79 mm
TTL: 6.98 mm
BFL: 1.22 mm

The projection optical system according to the sixth embodiment has surface data described below (in mm).

TABLE 6

| Lens Data in Sixth Embodiment | | | | |
| --- | --- | --- | --- | --- |
| | r | d | nd | vd |
| Aperture stop | Infinity | −1.132 | | |
| 2* | 2.740 | 1.716 | 1.545 | 56.0 |
| 3* | 15.670 | 1.426 | | |
| 4* | −1.603 | 0.557 | 1.651 | 21.5 |
| 5* | −1.722 | 0.103 | | |
| 6* | 3.730 | 1.762 | 1.545 | 56.0 |
| 7* | 5.753 | 0.514 | | |
| 8 | Infinity | 0.700 | 1.516 | 64.1 |
| 9 | Infinity | 0.200 | | |
| Image surface | | | | |

The projection optical system according to the sixth embodiment has aspherical surface data described below.
Second Surface
K=1.539E−01
A4=−1.839E−03, A6=4.800E−04, A8=−1.134E−04, A10=−4.558E−06, A12=2.602E−06, A14=4.437E−08
Third Surface
K=9.999E−01
A4=5.828E−03, A6=−3.273E−04, A8=3.526E−05, A10=2.648E−05, A12=−1.142E−06, A14=−2.602E−07
Fourth Surface
K=−4.537E−01
A4=7.969E−03, A6=1.253E−02, A8=3.411E−04, A10=2.982E−05, A12=−5.299E−05
Fifth Surface
K=−2.834E+00
A4=−5.060E−02, A6=1.970E−02, A8=−4.553E−04, A10=−4.578E−04, A12=7.688E−05

Sixth Surface
  K=6.752E−01
  A4=−1.546E−02,  A6=4.540E−03,  A8=−8.779E−04,
    A10=1.852E−05, A12=1.397E−05, A14=−1.483E−06
Seventh Surface
  K=1.000E+00
  A4=−2.515E−02,  A6=4.703E−03,  A8=−3.567E−04,
    A10=1.974E−06, A12=−2.498E−06, A14=2.021E−07

The conditional expressions (1) to (5) for the projection optical system according to the sixth embodiment yield the values below.

$$f/EPD=1.05 \tag{1}$$

$$(r2+r1)/(r2-r1)=1.42 \tag{2}$$

$$d2/f=0.31 \tag{3}$$

$$c2/f=0.014 \tag{4}$$

$$(r4+r3)/(r4-r3)=28.00 \tag{5}$$

REFERENCE SIGNS LIST

L1 first lens
L2 second lens
L3 third lens
CG glass cover
D display surface of image display element
S aperture stop

The invention claimed is:

1. A projection optical system for projecting an image from an image display element in a magnified manner onto a projection surface, the system comprising, in sequence from the projection surface:
  an aperture stop;
  a first lens with a positive refractive power;
  a second lens with a positive refractive power; and
  a third lens with a positive refractive power, the third lens having a convex surface facing the projection surface side,
  wherein the projection optical system satisfies the conditional expressions:

$$1.0 < f/EPD < 1.35 \tag{1}$$

$$1.0 < (r2+r1)/(r2-r1) < 1.45 \tag{2}$$

$$0.2 < d2/f < 0.45 \tag{3}$$

where f is a focal length of the overall projection optical system,
  EPD is an entrance pupil diameter,
  r1 is a radius of curvature of a projection surface side of the first lens surface,
  r2 is a radius of curvature of an image display element side of the first lens surface, and
  d2 is an air spacing between the first lens and the second lens on an optical axis.

2. The projection optical system according to claim 1, wherein
  the projection optical system satisfies the conditional expression:

$$15 < |(r4+r3)/(r4-r3)| < 35 \tag{4}$$

where r3 is a radius of curvature of a projection surface side of the second lens surface, and
  r4 is a radius of curvature of an image display element side of the second lens surface.

* * * * *